(12) United States Patent
Araie et al.

(10) Patent No.: US 10,946,558 B2
(45) Date of Patent: Mar. 16, 2021

(54) LAMINATION MOLDING APPARATUS

(71) Applicant: Sodick Co., Ltd., Kanagawa (JP)

(72) Inventors: Ichiro Araie, Kanagawa (JP); Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 972 days.

(21) Appl. No.: 15/599,535

(22) Filed: May 19, 2017

(65) Prior Publication Data

US 2017/0334099 A1 Nov. 23, 2017

(30) Foreign Application Priority Data

May 19, 2016 (JP) .............................. JP2016-100277

(51) Int. Cl.
| | | |
|---|---|---|
| *B29C 35/08* | (2006.01) | |
| *B22F 3/10* | (2006.01) | |
| *B22F 3/105* | (2006.01) | |
| *B29C 64/153* | (2017.01) | |
| *B33Y 30/00* | (2015.01) | |
| *B33Y 50/02* | (2015.01) | |

(Continued)

(52) U.S. Cl.
CPC ........ *B29C 35/0805* (2013.01); *B22F 3/1017* (2013.01); *B22F 10/00* (2021.01); *B29C 64/153* (2017.08); *B29C 64/268* (2017.08); *B33Y 30/00* (2014.12); *B33Y 50/02* (2014.12); *C04B 35/64* (2013.01); *B22F 10/10* (2021.01); *B22F 2999/00* (2013.01); *B29C 2035/0833* (2013.01); *B29C 2035/0838* (2013.01); *Y02P 10/25* (2015.11)

(58) Field of Classification Search
CPC . B29C 35/0805; B29C 64/153; B29C 64/268; B29C 2035/0833; B29C 2035/0838; B33Y 30/00; B33Y 50/02; B22F 3/1017; B22F 3/1055; B22F 2003/1057; B22F 2999/00; B22F 2003/1056; C04B 35/64; Y02P 10/295
See application file for complete search history.

(56) References Cited

U.S. PATENT DOCUMENTS

| 5,904,890 A | 5/1999 | Lohner et al. |
| 6,215,093 B1 | 4/2001 | Meiners et al. |

(Continued)

FOREIGN PATENT DOCUMENTS

| JP | 2920568 B2 | 8/1997 |
| JP | 2001-504897 A | 4/2001 |

(Continued)

OTHER PUBLICATIONS

Japanese Office Action dated Aug. 29, 2017, in connection with the counterpart JP Application No. 2016-100277 (4 pgs., including English translation).

*Primary Examiner* — Nahida Sultana
(74) *Attorney, Agent, or Firm* — Maier & Maier, PLLC

(57) ABSTRACT

A lamination molding apparatus including a chamber covering a molding region; a laser beam source to emit a laser beam for sintering a material powder supplied on the molding region to form a sintered layer; and a scan unit to scan the laser beam. The laser beam has one or more spot shapes including at least an elongated shape, and the scan unit is configured to scan the laser beam, of which the spot shape is an elongated shape, in a lateral direction of the elongated shape, is provided.

8 Claims, 16 Drawing Sheets

(51) Int. Cl.
*B29C 64/268* (2017.01)
*B22F 10/00* (2021.01)
*C04B 35/64* (2006.01)
*B22F 10/10* (2021.01)

(56) References Cited

U.S. PATENT DOCUMENTS

| | | | |
|---|---|---|---|
| 6,316,744 B1* | 11/2001 | Nowotny | B23K 26/144 |
| | | | 219/121.84 |
| 2002/0134765 A1 | 9/2002 | Tanaka et al. | |
| 2006/0116000 A1* | 6/2006 | Yamamoto | H01L 21/7682 |
| | | | 438/795 |
| 2006/0163743 A1* | 7/2006 | Kuwabara | H01L 27/124 |
| | | | 257/773 |
| 2015/0273631 A1 | 10/2015 | Kenney et al. | |
| 2016/0114427 A1 | 4/2016 | Eibl et al. | |
| 2016/0288264 A1* | 10/2016 | Jones | C23C 24/10 |
| 2016/0368097 A1* | 12/2016 | Ohno | B33Y 30/00 |
| 2018/0345405 A1* | 12/2018 | Ostroverkhov | B23K 26/342 |
| 2019/0009369 A1* | 1/2019 | Vorontsov | B23K 26/703 |

FOREIGN PATENT DOCUMENTS

| | | |
|---|---|---|
| JP | 2002-280323 A | 9/2002 |
| JP | 2016-502596 A | 1/2016 |
| JP | 2016-507377 A | 3/2016 |

* cited by examiner

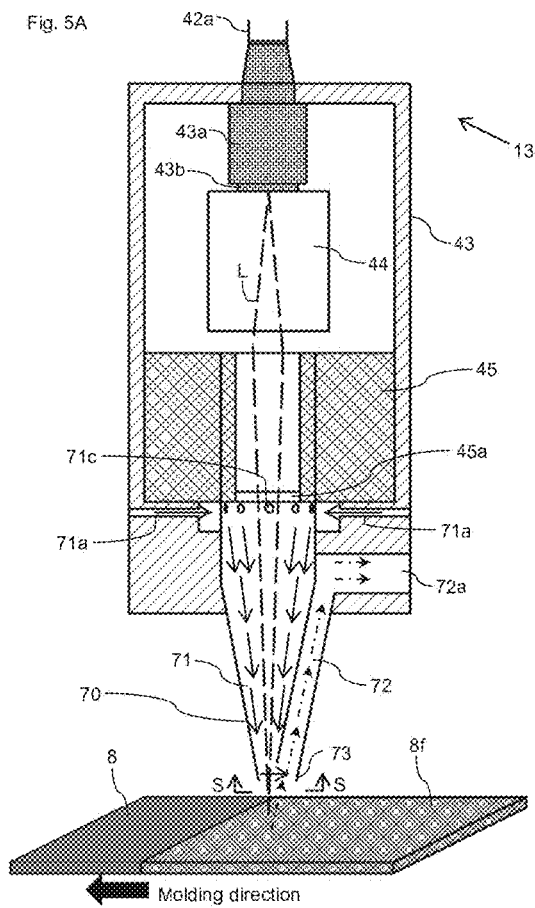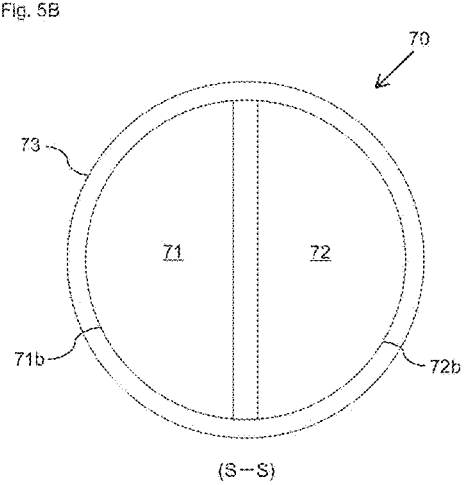

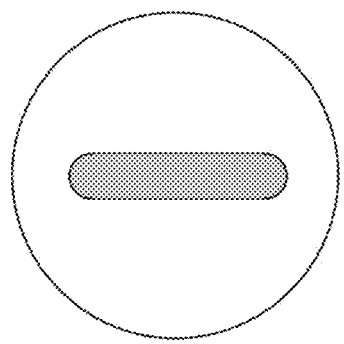
Fig. 8A  0 deg
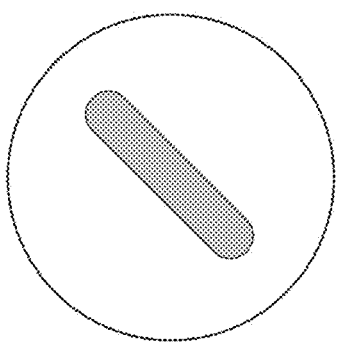
Fig. 8B  45 deg
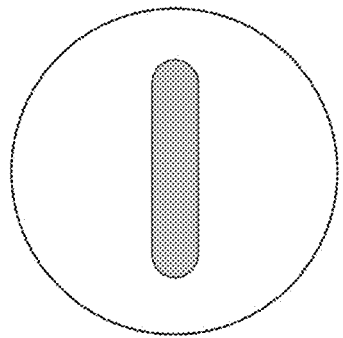
Fig. 8C  90 deg
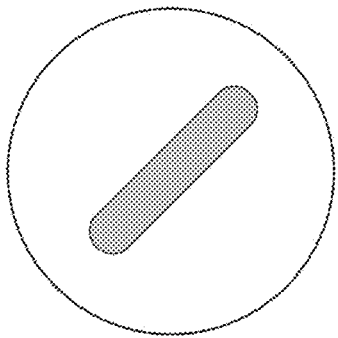
Fig. 8D  135 deg

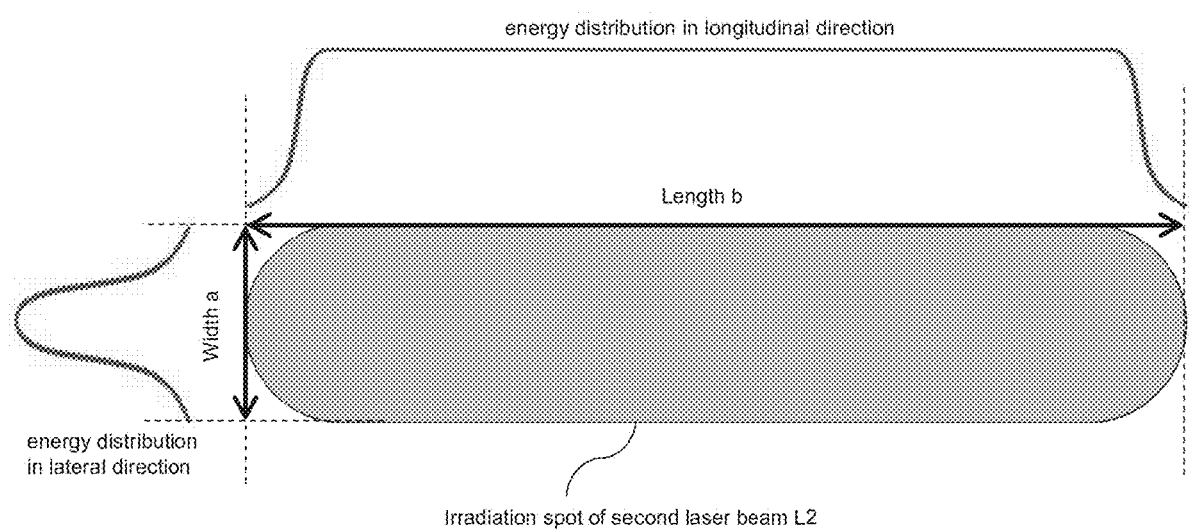

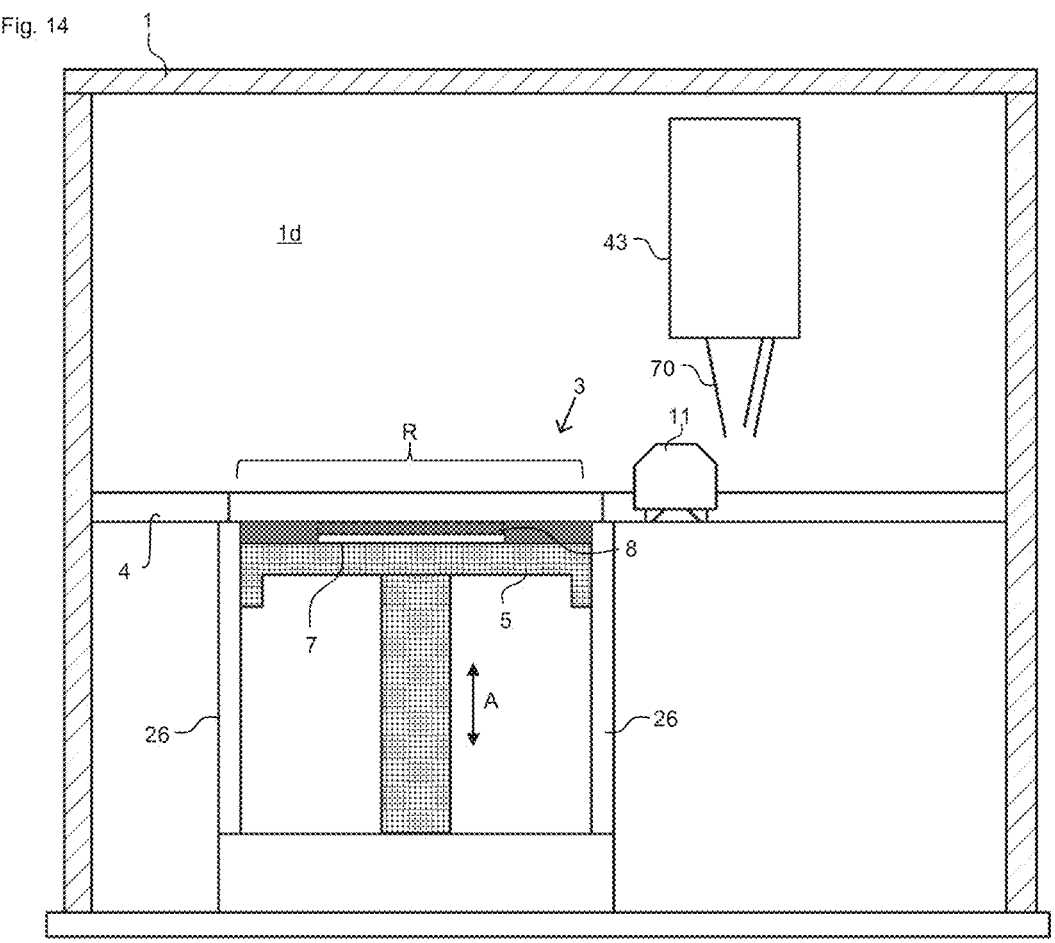

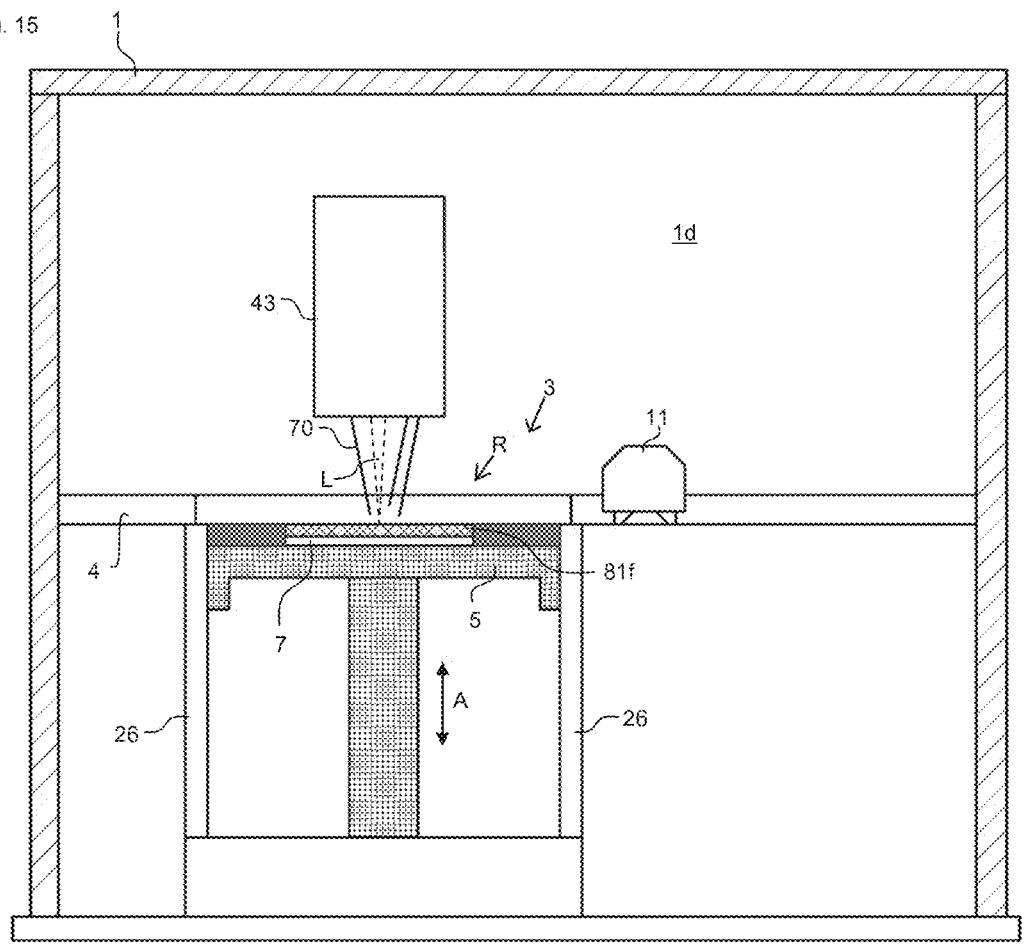

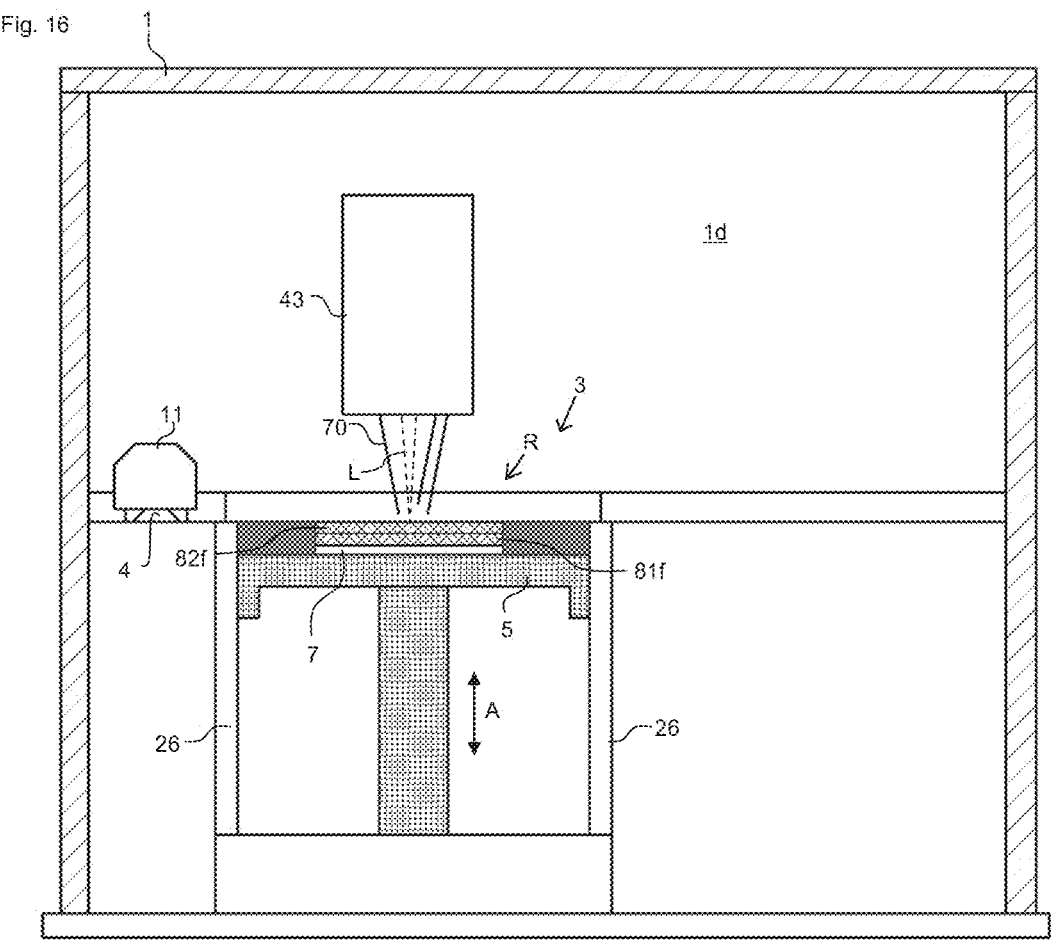

LAMINATION MOLDING APPARATUS

FIELD OF THE INVENTION

The present invention relates to the lamination molding apparatus.

BACKGROUND OF THE INVENTION

In a lamination molding method by powder sintering using laser beam, inside a sealed chamber, a very thin material powder layer is formed on a molding table capable of moving vertically, followed by irradiation of a predetermined position of the material powder layer with a laser beam, thereby sintering the material powder. These procedures are repeated to attain the desired three-dimensional shape of a sintered object integrally formed by laminating a plurality of sintered layers.

A typical laser irradiation device of the lamination molding apparatus as disclosed in Patent Document 1 is configured to scan the laser beam along a predetermined movement path using an optical deflector such as a galvanometer scanner fixedly arranged on the upper side of a machine main unit. Specifically, for example, the spot shape having a substantially circular shape with a predetermined diameter is scanned at a predetermined moving speed along a scanning pattern formed by arranging linear paths of an appropriate width for each material powder layer in parallel (a so-called raster scanning line). Then, the material powder in a predetermined irradiation region which is substantially correspond with a contour shape of a three-dimensional molded object desired is sintered. In order to shorten molding time, it is desirable that the scanning speed of the laser beam be as high as possible.

Further, the energy distribution of the laser beam in a substantially circular shape is not uniform and the energy thereof becomes lower at the peripheral portion in general. Therefore, as disclosed in Patent Document 2, the laser beam is irradiated so that adjacent scan lines overlap with each other, thereby energy required for sintering the material powder can be obtained.

PRIOR ART DOCUMENTS

Patent Literature

[Patent Document 1] JP 2920568
[Patent Document 2] JP-T 2001-504897

SUMMARY OF INVENTION

Technical Problem

However, when scanning the laser beam of which spot shape is substantially circular at high speed so that adjacent scan lines overlap with each other, the material powder is not uniformly heated. As a result, sintering failure such as voids and projecting abnormal sintered parts may occur, and the quality of molding may decrease.

The present invention has been made by taking these circumstances into consideration. An objective of the present invention is to provide a lamination molding apparatus, capable of molding the molded object with high quality.

Means to Solve the Problem

According to an aspect of the present invention, a lamination molding apparatus, comprising: a chamber covering a molding region; a laser beam source to emit a laser beam for sintering a material powder supplied on the molding region to form a sintered layer; and a scan unit to scan the laser beam, wherein: the laser beam comprises one or more spot shapes including at least an elongated shape, and the scan unit is configured to scan the laser beam, of which the spot shape is an elongated shape, in a lateral direction of the elongated shape, is provided.

Effect of the Invention

The lamination molding apparatus according to the present invention is configured to scan the laser beam of which the spot shape is an elongated shape in the lateral direction. With such a configuration, the molded object with high quality can be obtained.

Hereinafter, various embodiments of the present invention will be provided.

The embodiments provided below can be combined with each other.

Preferably, the apparatus of claim 1, wherein: the spot of the laser beam has a uniform intensity distribution over a longitudinal direction of the elongated shape.

Preferably, the apparatus is configured to change a direction of the spot shape of the laser beam.

Preferably, the laser beam is a pulsed laser.

Preferably, the apparatus is so configured that the spot shape of the laser beam is changeable to a shape selected from a plurality of spot shapes including the elongated shape.

Preferably, the scan unit comprises a holder provided with an emit end of the laser beam source and a drive device for moving the holder to an arbitrary position above the molding region.

Preferably, the elongated spot shape of the laser beam has a ratio of a length in the longitudinal direction and a width in the lateral direction, wherein the ratio of the length to the width is 4 to 1000.

BRIEF DESCRIPTION OF THE DRAWINGS

FIGS. 5A and 5B are schematic views showing a cross section of a holder 43 according to an embodiment of the present invention.

FIG. 8A to 8D are diagrams for explaining the rotation of a spot shape according to an embodiment of the present invention.

FIG. 10 is a diagram showing the spot shape of the second laser beam L2 according to an embodiment of the present invention.

FIGS. 13 to 16 are diagrams for explaining a lamination molding method using a lamination molding apparatus according to one embodiment of the present invention.

DESCRIPTION OF THE PREFERRED EMBODIMENTS

Hereinafter, some embodiments of the present invention will be described with reference to the drawings. Here, the characteristic matters shown in the embodiments can be combined with each other.

Figure 1:
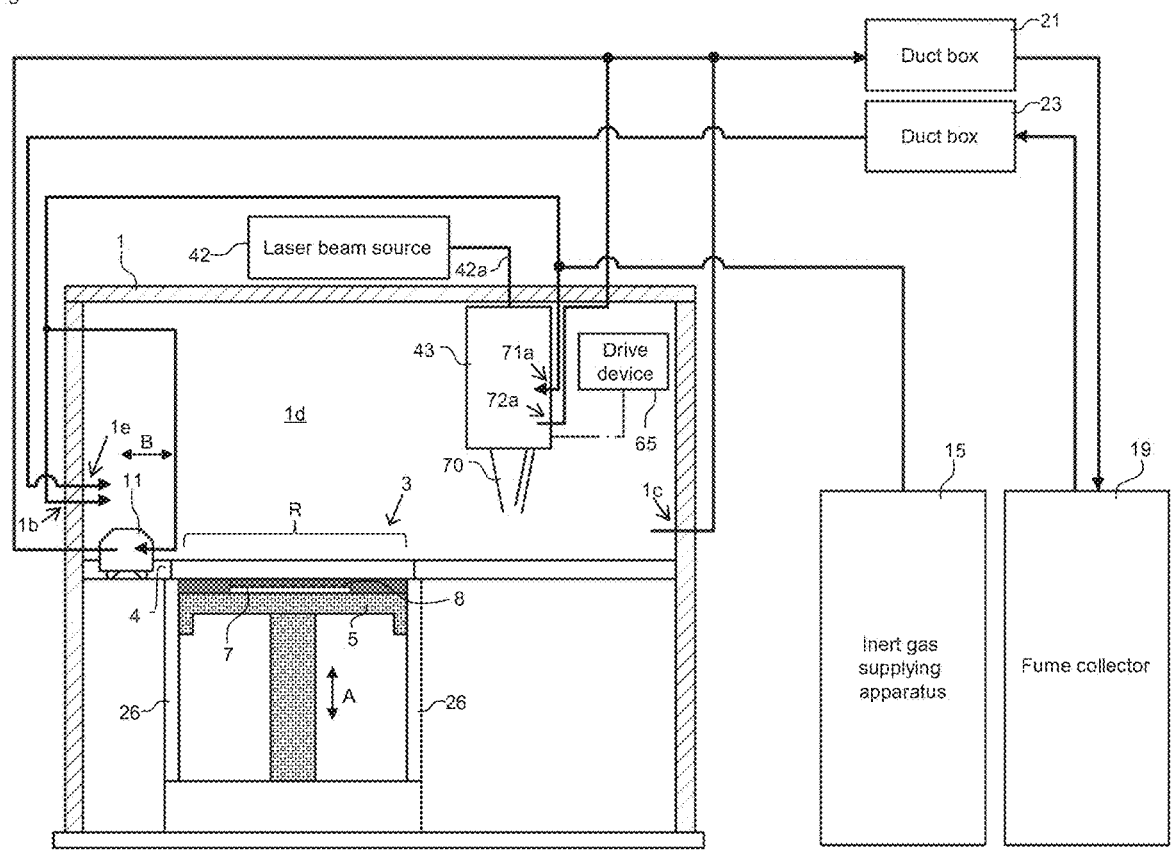
FIG. 1 is a configuration diagram of a lamination molding apparatus according to an embodiment of the present invention.

As shown in FIG. 1, a lamination molding apparatus according to an embodiment of the present invention is provided with a powder layer forming apparatus 3 in a chamber 1 filled with inert gas.

The powder layer forming apparatus 3 comprises a base 4 having a molding region R and a recoater head 11 arranged on the base 4 and movable in a horizontal one axis direction (indicated as arrow B). In the molding region R, a molding table 5 which can vertically move (in a direction indicated as arrow A in FIG. 1) is provided. When using the lamination molding apparatus, a molding plate 7 is placed on the molding table 5, and a material powder layer 8 is formed thereon. A predetermined irradiation region existing in the molding region R is substantially consistent with the area surrounded by the contour of a desired three-dimensional molded object.

A powder retaining wall 26 is provided around the molding table 5, and the non-sintered material powder is retained in the powder retaining space surrounded by the powder retaining wall 26 and the molding table 5. Although not shown in FIG. 1, below the powder retaining wall 26, a powder discharging section capable of discharging the material powder in the powder retaining space may be provided. In this case, after completion of the lamination molding, the molding table 5 is descended so as to discharge the non-sintered material powder from the powder discharging section. The material powder discharged is guided to the chute by the chute guide, and then the material powder is retained in the bucket via the chute.

Figure 2:
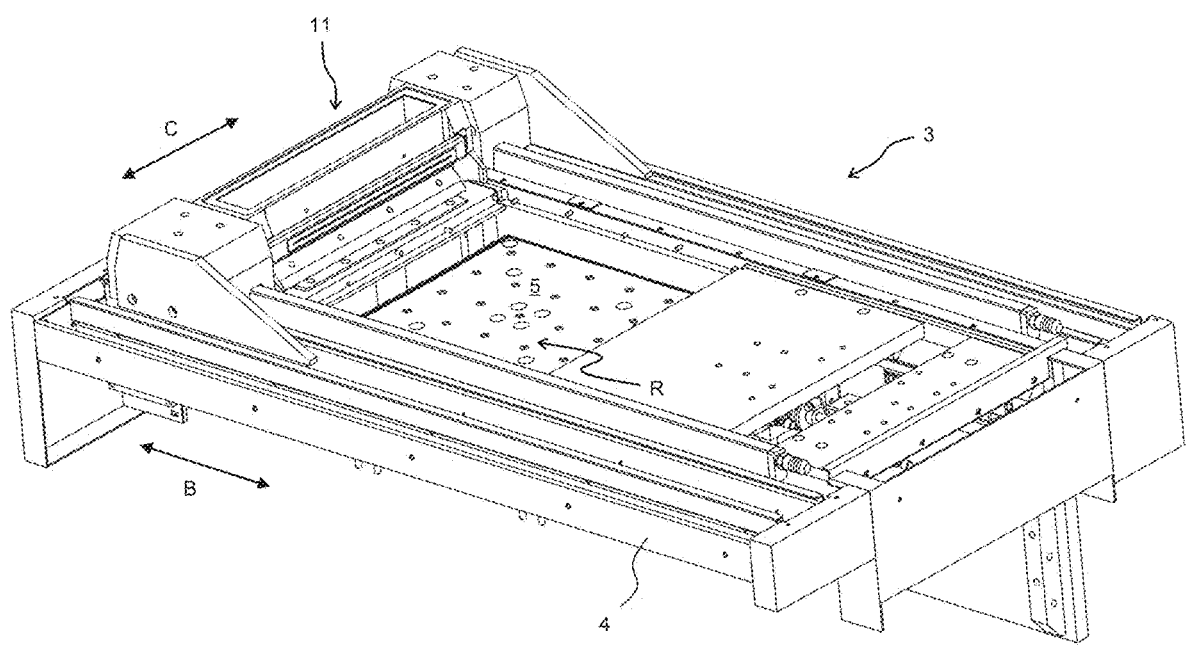
FIG. 2 is a perspective view of a powder layer forming apparatus 3 according to an embodiment of the present invention.
Figure 3:
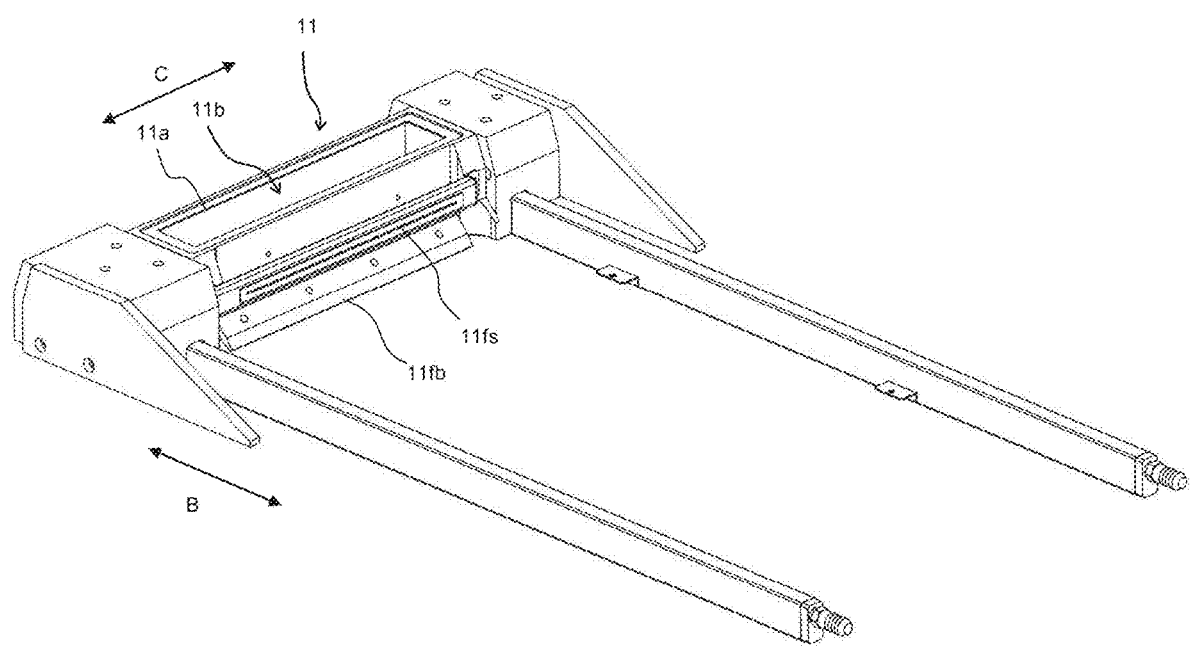
FIGS. 3 and 4 are perspective views of a recoater head 11 according to one embodiment of the present invention.
Figure 4:
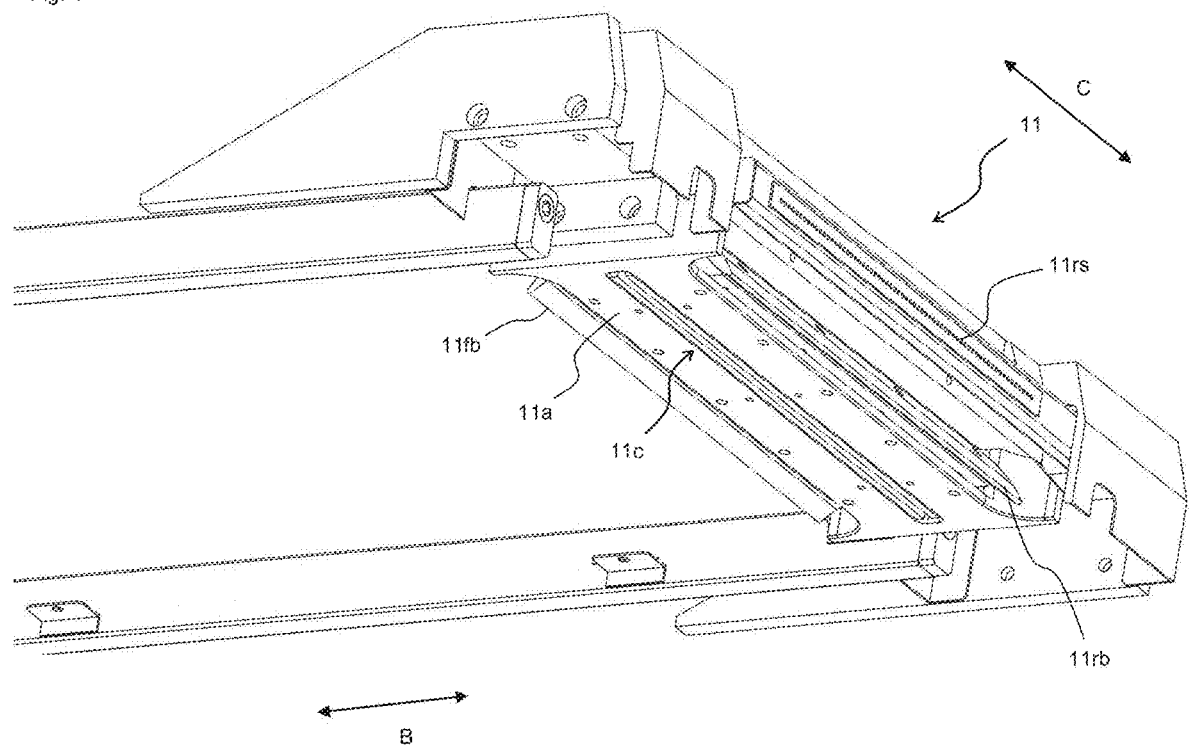

As shown in FIGS. 2 to 4, the recoater head 11 comprises a material holding section 11a, material supplying section 11b and material discharging section 11c.

The material holding section 11a stores the material powder. Note that the material powder is, for example, metal powder such as iron powder having a sphere shape with an average particle diameter of 20 μm. The material supplying section 11b is provided on the top surface of the material holding section 11a, and is configured to receive the material powder to be supplied from a material supplying device (not shown) to the material holding section 11a. The material discharging section 11c is provided on the bottom surface of the material holding section 11a, and discharges the material powder in the material holding section 11a. Note that the material discharging section 11c has a slit shape which elongates in the horizontal uniaxial direction (direction shown by arrow C) crossing orthogonally with the moving direction (direction shown by arrow B) of the recoater head 11.

Blades 11fb and 11rb, a recoater head supplying opening 11fs, and a recoater head discharging opening 11rs are provided on both sides of the recoater head 11, respectively. The blades 11fb and 11rb form a material powder layer 8 by planarizing the material powder discharged from the material discharging section 11c. The recoater head supplying opening 11fs and recoater head discharging opening 11rs are provided along the horizontal uniaxial direction (direction shown by arrow C) crossing orthogonally with the moving direction (direction shown by arrow B) of the recoater head 11, thereby supplying and discharging the inert gas, respectively (details to be described later). Here, in the present specification, "inert gas" is a gas which substantially does not react with the material powder, and nitrogen gas, argon gas and helium gas can be mentioned for example.

A laser beam source 42 is provided above the chamber 1. As shown in FIGS. 1 and 5A, the laser beam source 42 is connected to a holder 43 through an optical cable 42a and optical connector 43a. Since the laser beam L is emitted from the end of the optical connector 43a, the end of the optical connector 43a is denoted as a laser beam emit end 43b in FIG. 5A.

The holder 43 is configured to extend from the top inside the chamber 1 towards the molding region R so that therein the laser beam L passes through a collimator 44, optical processing unit 45, protective glass 45a and inert gas supplying cover 71 of a cover unit 70, and the material powder layer 8 supplied on the molding region R is sintered. The holder 43 is capable of moving to an arbitrary position above the molding region R by the drive device 65. The collimator 44 turns the laser beam L into parallel light. The optical processing unit 45 controls the irradiation spot shape etc. of the laser beam L. The optical processing unit 45 and cover unit 70 will be described later in detail.

According to the above configuration, the laser beam L is irradiated in the downward direction of the holder 43. By moving the holder 43 to a desired position by the drive device 65, the laser beam L can be irradiated to a desired position. That is, the holder 43 and drive device 65 function as a scan unit to scan the laser beam L.

The type of the laser beam L is not limited as long as one is capable of sintering the material powder, and it is, for example, a $CO_2$ laser, fiber laser, YAG laser, or the like.

At the lower side of the holder 43, the cover unit 70 is provided. By controlling the height of the holder 43, the end of the cover unit 70 can be brought close to the molding region R, and the end thereof is open. The cover unit 70 comprises an inert gas supplying cover 71 and a fume suction cover 72. The openings of the inert gas supplying cover 71 and the fume suction cover 72, which are referred to as a blowout opening 71b and suction opening 72b respectively, are substantially adjacent. In the example shown in FIG. 5A, the inert gas supplying cover 71 and fume suction cover 72 may be configured in one piece.

The inert gas supplying cover 71 comprises a cover unit supplying opening 71a as a supplying opening to supply the inert gas therein. The cover unit supplying opening 71a is connected to an inert gas supplying apparatus 15, and is configured so that clean inert gas flows into the inert gas supplying cover 71 through pores 71c. The optical processing unit 45 and the protective glass 45a partition the inside of the inert gas supplying cover 71, and the protective glass 45a allows the laser beam L to pass through while preventing the inert gas containing the fume from flowing into the upper part. For example, in a case where the laser beam L is fiber laser or YAG laser, the protective glass 45a can be structured with a quartz glass.

The fume suction cover 72 is provided so that the suction opening 72b thereof is substantially adjacent to the blowout opening 71b of the inert gas supplying cover 71. In addition, the fume suction cover 72 is provided so that the inside thereof extends towards the side face of the holder 43, and a cover unit discharging opening 72a is provided on the side face of the holder 43. The cover unit discharging opening 72a is connected to a fume collector 19 to be described later via a duct box 21, and is configured so that the inert gas containing the fume flows into the fume suction cover 72.

Next, an inert gas supplying/discharging system will be explained. The inert gas supplying/discharging system comprises a plurality of supplying openings and discharging openings of the inert gas provided in the chamber 1, and pipes for connecting each supplying opening and discharging opening to an inert gas supplying apparatus 15 and fume collector 19. In the present embodiment, the supplying openings including the recoater head supplying opening 11fs, a chamber supplying opening 1b, a sub supplying opening 1e and the cover unit supplying opening 71a, and the discharging openings including a chamber discharging opening 1c, the recoater head discharging opening 11rs and cover unit discharging opening 72a are provided.

The recoater head supplying opening 11fs is provided so as to depend on the installation position of the chamber discharging opening 1c and to face the chamber discharging opening 1c. Desirably, the recoater head supplying opening 11fs is provided on one side of the recoater head 11 along the direction indicated as the arrow C so as to face the chamber discharging opening 1c when the recoater head 11 is positioned on the opposite side across a predetermined irradiation region with respect to a position at which the material supplying device (not shown) is installed.

The chamber discharging opening 1c is provided on the side wall of the chamber 1 at a certain distance from a predetermined irradiation region so as to face the recoater head supplying opening 11fs. A suction device (not shown) may be provided connecting with the chamber discharging opening 1c. The suction device facilitates eliminating the fume efficiently from the optical path of the laser beam L. In addition, the suction device enables a greater amount of fumes to be discharged through the chamber discharging opening 1c, thereby the fume diffusion within the molding room 1d is alleviated.

The chamber supplying opening 1b is provided on the edge of the base 4 so as to face the chamber discharging opening 1c across a predetermined irradiation region. The chamber supplying opening 1b is selectively switched to open, but instead the recoater head supplying opening 11fs is switched to close when the recoater head 11 is positioned on the opposite side with respect to the recoater head supplying opening 11fs, without placing a predetermined irradiation region therebetween. The chamber supplying opening 1b supplies the inert gas into the chamber discharging opening 1c, of which pressure and flow rate are the same as the inert gas supplied from the recoater head supplying opening 11fs, thereby generating a flow of the inert gas in the same direction. Consequently, stable sintering is beneficially provided.

The recoater head discharging opening 11rs is provided on the opposite side of the side in which the recoater head supplying opening 11fs is provided, of recoater head 11 along the direction shown by arrow C. While the recoater head supplying opening 11fs does not supply the inert gas, in other words, the chamber supplying opening 1b supplies the inert gas, some fume is discharged by generating a flow of the inert gas in the more vicinity of a predetermined irradiation region, thereby eliminating the fume more efficiently from the optical path of the laser beam L.

The inert gas supplying/discharging system according to the present embodiment comprises a sub supplying opening 1e, the cover unit supplying opening 71a and the cover unit discharging opening 72a. The sub supplying opening 1e is provided on the side wall of the chamber 1 so as to face the chamber discharging opening 1c, and supplies clean inert gas, of which the fume is removed, sent from the fume collector 19 into the molding room 1d. The cover unit supplying opening 71a supplies the inert gas into the inert gas supplying cover 71 of the cover unit 70. The cover unit discharging opening 72a discharges the inert gas containing a large amount of fumes through the fume suction cover 72.

The inert gas supplying system to supply the inert gas into the chamber 1 is connected with the inert gas supplying apparatus 15 and fume collector 19. The inert gas supplying apparatus 15 has a function to supply the inert gas, and is, for example, a device comprising a membrane type nitrogen separator to extract the nitrogen gas from the circumambient air. In the present embodiment, as shown in FIG. 1, the inert gas supplying apparatus is connected to the recoater head supplying opening 11fs, chamber supplying opening 1b and cover unit supplying opening 71a.

The fume collector 19 comprises duct boxes 21 and 23 provided at its upper stream side and its lower stream side, respectively. The inert gas containing fume discharged from the chamber 1 is sent to the fume collector 19 through the duct box 21. Then, fume is removed in the fume collector 19, and the cleaned inert gas is sent to the sub supplying opening 1e of the chamber 1 through the duct box 23. According to such constitution, the inert gas can be recycled.

For the inert gas discharging system as shown in FIG. 1, the chamber discharging opening 1c and recoater head discharging opening 11rs and cover unit discharging opening 72a are respectively connected with the fume collector 19 through the duct box 21. The inert gas after removal of the fume by the fume collector 19 returns to the chamber 1 and is recycled.

The inert gas supplying/discharging system described above is merely an example and it is not limited thereto. In particular, the inert gas supplying system is preferably connected to the cover unit supplying opening 71a of the inert gas supplying cover 71 in the cover unit 70 provided with the holder 43, and the fume discharging system is preferably connected to the cover unit discharging opening 72a of the inert gas supplying cover 71 in the cover unit 70 provided with the holder 43.

As shown in FIGS. 5A and 5B, by supplying the inert gas to the cover unit supplying opening 71a, the inert gas passes through the inert gas supplying cover 71 from the blowout opening 71b to the molding room 1d, in particular, the molding region R. Thereby, it is possible to keep the inside of the inert gas supplying cover 71 in a fume-free and clean state. As a result, the laser beam L passing through the inside of the inert gas supplying cover 71 is irradiated to the material powder layer 8 without being blocked by the fume. Preferably, the supply pressure of the inert gas flowing into the cover unit supplying opening 71a is set to be slightly higher than the pressure of the inert gas supplied from the other supplying openings, which allows easy forming of the flow flowing from the inside of the inert gas supplying cover 71 towards the molding room 1d. For example, the supply pressure of the cover unit supplying opening 71a is higher than that of the other supplying openings by 5% or more. Also, in order to keep the inside of the inert gas supplying cover 71 clean, it is preferable to increase the flow velocity of the flow toward the blowout opening 71b to such an extent that the material powder is not scattered. Therefore, it is preferable that the cross section of the inert gas supplying cover 71 is configured so that the cross section thereof becomes smaller from the top toward the bottom. In addition, the diameter of the blowout opening 71*b* is preferably approximately 2 to 20 times the length of the longitudinal direction of the elongated spot shape of the laser beam L. Note that the shape and configuration of the cross section of the holder 43 and cover unit 70 shown in FIGS. 5A and 5B are merely examples and are not limited thereto.

In the present embodiment, the inert gas from the fume collector 19 is sent to the sub supplying opening 1*e*, and the inert gas from the inert gas supplying apparatus 15 is sent to the recoater head supplying opening 11*fs*, chamber supplying opening 1*b* and cover unit supplying opening 71*a*. Although the fumes which could not be removed might remain in the inert gas from the fume collector 19, in the configuration of the present embodiment, the influence of residual fumes can be minimized since the inert gas from the fume collector 19 is not supplied to the space in which the particularly high purity of the inert gas is required, namely, the space inside the inert gas supplying cover 71 and in the vicinity of the molding region R. Also, by setting the supply pressure of the inert gas from the inert gas supplying apparatus 15 to be higher than the supply pressure of the inert gas from the fume collector 19, the inert gas from the fume collector 19 is suppressed from approaching the space in the inert gas supplying cover 71 and in the vicinity of the molding region R, and then the influence of remaining fumes is more effectively suppressed.

As described above, the optical path of the laser beam L exists in the inert gas supplying cover 71. By irradiation with the laser beam L, the material powder layer 8 is sintered and thereby forming a sintered layer 8*f*. At this time, fumes are generated. In the present embodiment, the blowout opening 71*b* of the inert gas supplying cover 71 and the suction opening 72*b* of the fume suction cover 72 are substantially adjacent to each other. In addition, the holder 43 can be lowered by the drive device 65 to bring the suction opening 72*b* of the fume suction cover 72 as close as possible to the molding region R. As a result, it is possible to suction the fumes generated by the irradiation of the laser beam L at a position obviously closer than the prior art.

Further, as shown in FIG. 5, it is preferable that the blowout opening 71*b* of the inert gas supplying cover 71 is provided on the front side of the cover unit 70, and the suction opening 72*b* of the fume suction cover 72 is provided on the rear side of the cover unit 70 in a molding direction. With such a configuration, since a flow is formed in a direction opposite to the molding direction, the flow of the inert gas blown out from the blowout opening 71*b* can be formed more effectively, the flow collecting fumes generated and carrying them to the suction opening 72*b*. Furthermore, since the suction opening 72*b* is positioned above the sintered layer already irradiated with the laser beam L during the molding, it is capable of preventing inadvertent suction of the material powder via the suction opening 72*b*. In order to achieve such a configuration, when the cover unit 70 is fixed, the molding direction should be constant. Alternatively, the cover unit 70 may be configured to be rotatable, and the positions of the blowout opening 71*b* and suction opening 72*b* may be changed according to the molding direction.

Figure 6A:
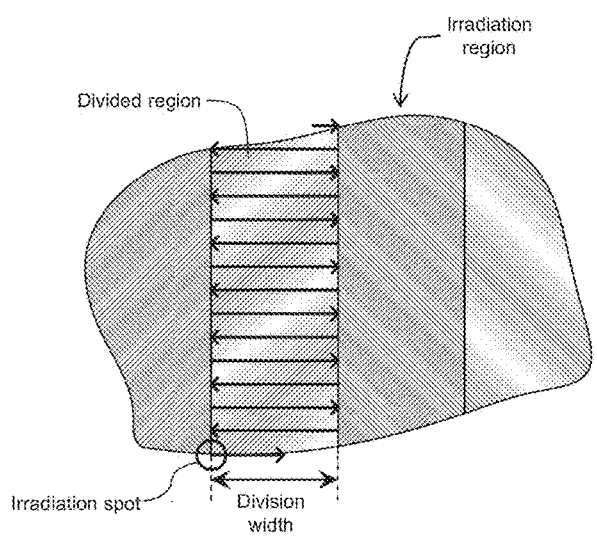
FIGS. 6A and 6B are schematic views illustrating an irradiation region and a divided region of a laser beam L.

Here, the molding direction will be explained. In forming the sintered layer by the laser beam L, as shown in FIG. 6A, the irradiation region for each material powder layer 8 is divided for each predetermined width, the raster scan of the laser beam L for each divided region is repeated to form sintered layers, and thereby the desired sintered layer corresponding to the irradiation region is formed. Here, a width dividing the sintered layer into each divided region is referred to as a dividing width. Moreover, a direction orthogonal to the direction of the division width, in other words, the direction in which the sintered layer is gradually formed in each of the divided regions is called the molding direction. Note that the arrow indicated in FIG. 6A shows an example of the optical path of the laser beam L in the divided region.

Figure 7A:
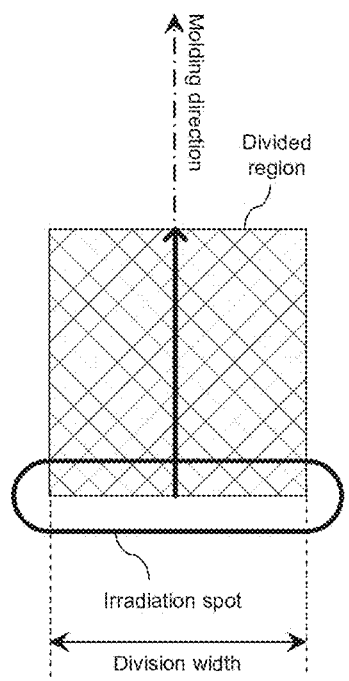
FIGS. 7A to 7C are schematic views illustrating an optical path of the laser beam L.
Figure 7B:
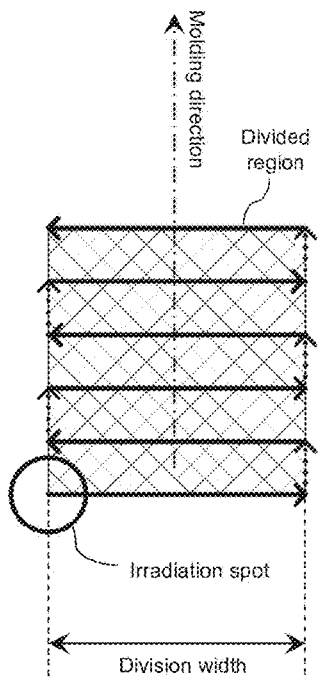
Figure 7C:
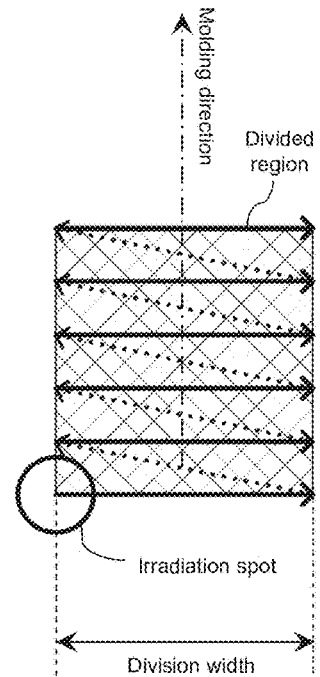

In FIGS. 7A to 7C, the optical path of the laser beam L for each divided region is exemplified. FIG. 7A shows an example using the laser beam L having the spot shape of a horizontally elongated shape (an obround shape in this example) of which the length in longitudinal direction coincides with the width of the division width, and the molding direction coincides with the scan direction of the laser beam L. FIGS. 7B and 7C illustrate examples using the laser beam L having a substantially circular spot shape, in which the linear scan paths having the same length as the division width are arranged in parallel, and each linear scan is continually performed along the molding direction. In such a case, the direction of the molding direction and direction of each linear scan are orthogonal. In the optical path of the laser beam L as shown in FIG. 7, a solid line shows that the irradiation of the laser beam L is on, a dotted line shows that the irradiation of the laser beam L is off, respectively.

In forming a certain sintered layer according to the irradiation region with the same molding time, compared to a case of using the laser beam L having the elongated spot shape as shown in FIG. 7A with a case of using the laser beam L having a substantially circular spot shape as shown in FIGS. 7B and 7C, the scanning speed can be lowered more in the former. In other words, each linear scan in the lamination molding method using the laser beam L having a substantially circular shape as shown in FIGS. 7B and 7C, as described in BACKGROUND OF THE INVENTION, it is desirable to scan as fast as possible in order to shorten the molding time, and the laser beam L is scanned by an optical deflector capable of high-speed scanning represented by a galvanometer scanner in general. On the other hand, as shown in FIG. 7A, when scanning the laser beam L having the elongated spot shape along the molding direction, since the scanning speed may be lower than that of the conventional configuration, it is unnecessary to use a high-speed scan device for the laser beam such as galvanometer scanner generally costly. Therefore, in the present embodiment, the laser beam L having the elongated spot shape is irradiated by moving the laser beam emit end 43*b* to a desired irradiation position by the drive device 65. This will be explained again in detail in the description of the optical processing unit 45. Further, by using the laser beam L having the elongated spot shape, it is possible to sinter the material powder by the slow scan of the laser beam L having a relatively low energy density. As a result, occurrence of abnormal sintered portions, voids and the like can be suppressed, and a stable molding can be performed.

Figure 6B:
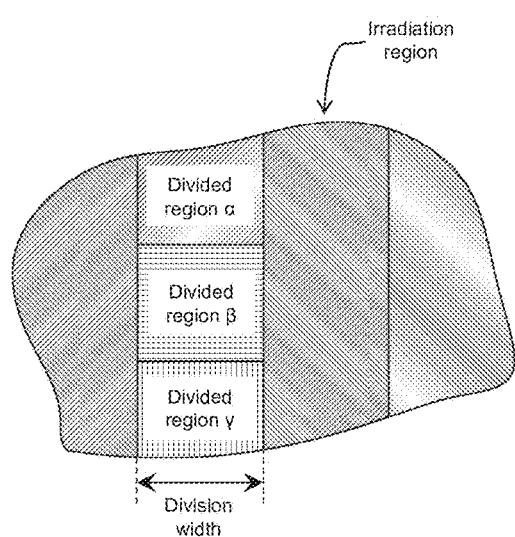

In forming the sintered layer, each of the divided regions may be further divided along the molding direction. As an example here, as shown in FIG. 6B, a certain divided region is divided into divided regions α, β and γ. As for the sintering of the divided region further divided, the sintering of adjacent divided regions may not necessarily be performed consecutively such as the order of the divided region α, the divided region γ, the divided region β, for example. Further, as for a peripheral portion of the irradiation region, a sintered layer may be formed by a vector scan. Exceptionally, when performing a vector scan, the scan direction and molding direction are exceptionally defined as the same direction.

As shown in FIGS. 5A and 5B, the optical processing unit 45 comprises a spot shape conversion optical system 45b and spot shape rotation mechanism 45c for rotating the spot shape conversion optical system 45b. As the spot shape conversion optical system 45b, for example, a micro-lens array or diffraction grating may be used. The micro-lens array is an optical element including lenses arranged in an array therein. The incident of the laser beam L is divided into the number of the arrays, and by superimposing each beam, the laser beam L having the substantially uniform intensity distribution can be formed. Also, by using a diffraction grating, the incident of the laser beam L thereon is split in the same manner, and by superimposing each beam, the laser beam L having a substantially uniform intensity distribution can be formed. The spot shape rotation mechanism 45c may be, for example, the rotation mechanism by a direct drive or rotation mechanism by a belt or the like. FIGS. 8A to 8D schematically show a state in which the spot shape is rotated by the spot shape rotation mechanism 45c. The step of the rotation angle is, for example, 5, 10, 15, 30, 45, 60, 90 degrees. The step of the rotation of the present invention is not limited to these.

Figure 9A:
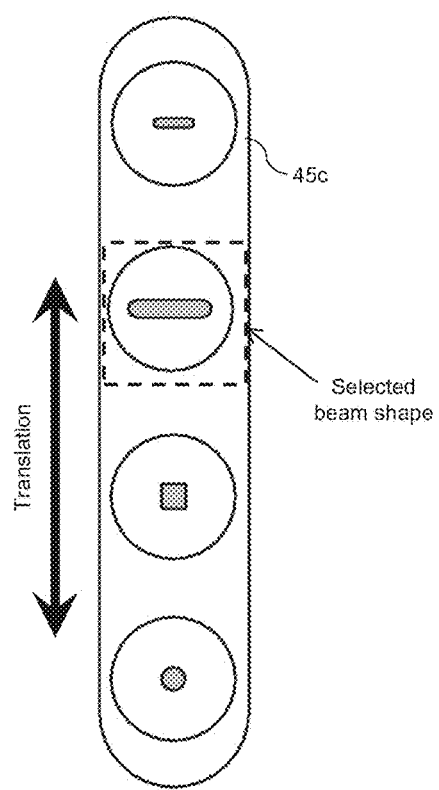
FIGS. 9A and 9B are schematic diagrams showing an irradiation head 45d according to an embodiment of the present invention.
Figure 9B:
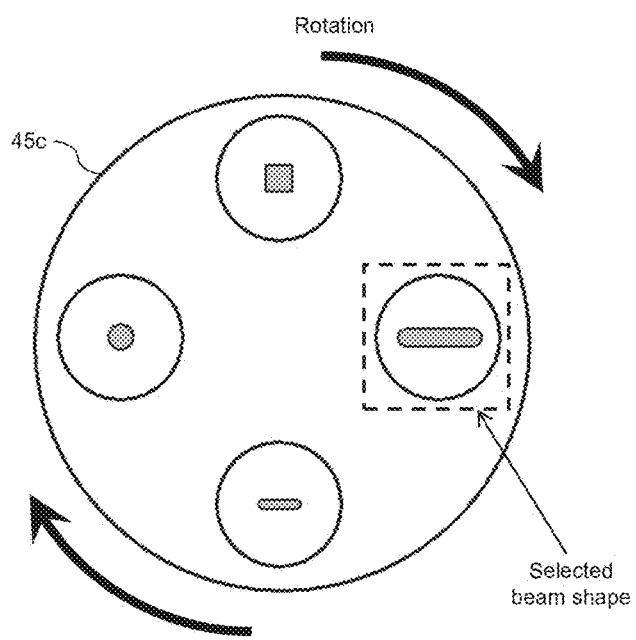

Further, as shown in FIGS. 9A and 9B, a plurality of types of the spot shape conversion optical system 45b are prepared, and an irradiation head 45d is configured so as to select a spot shape of the spot shape conversion optical system 45b. In FIG. 9A, the spot shape conversion optical system 45b is selected by translating the irradiation head 45d. Alternatively, as shown in FIG. 9B, the spot shape conversion optical system 45b may be selected by rotating the irradiation head 45d. Also, although not shown in the figure, a predetermined exchange arm may be provided so that the spot shape conversion optical system 45b can be exchanged together with the irradiation head 45d. Preferably, the spot shape is selected according to the shape of an irradiation position and the like, which will be described later using an example.

One of the spot shape conversion optical systems 45b converts a first laser beam L1 into a second laser beam L2. The first laser beam L1 is a laser beam L having a substantially circular spot shape emitted from the laser beam emit end 43b and collimated by the collimator 44. The second laser beam L2 is a laser beam L having an elongated spot shape. Note that an obround is shown as the second laser beam L2 in this example, but it may have a substantially uniform intensity distribution along the longitudinal direction, for example, it may be a rectangle. FIG. 10 shows such a spot shape. The ratio of the length b in the longitudinal direction to the width a in the lateral direction is preferably 4 to 1000, more preferably 30 to 200. Within such a range, in scanning as shown in FIG. 5A, it is possible to suppress the cause of poor quality such as voids generated at the time of the molding as much as possible and to achieve higher quality molding.

In order to realize high-quality molding, as shown in FIG. 10, with respect to the spot shape, the laser beam L has an energy enough to sinter the material powder and the intensity distribution thereof is substantially uniform over the longitudinal direction. For example, the intensity distribution in the longitudinal direction is top hat distribution. On the other hand, the intensity distribution in the lateral direction may be as long as symmetry even if it is not substantially uniform, for example, Gaussian distribution. Note that the laser beam L having substantially uniform intensity distribution in the present invention is not limited to the laser beam L having a uniform energy, but includes the laser beam L configured so that the temperature rise of the material powder at the irradiation position is substantially uniform.

Figure 11A:
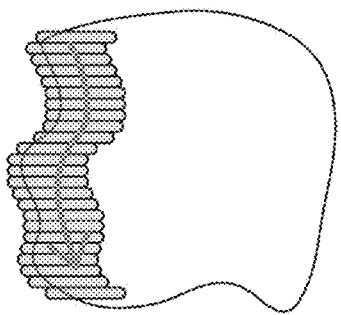
FIGS. 11A to 11F, and 12A and 12B are diagrams showing scan examples using the second laser beam L2 as shown in FIG. 10.
Figure 11B:
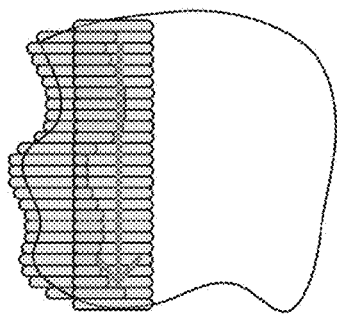
Figure 11C:
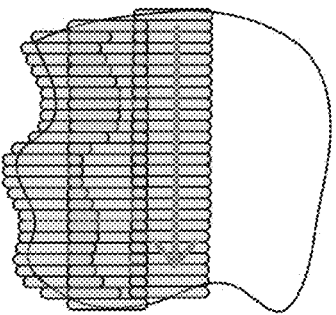

FIGS. 11A to 11F show an example of the scanning method of the laser beam L by the lamination molding apparatus of the present embodiment. FIGS. 11A, 11B and 11C sequentially show modes to form the desired sintered layer. The second laser beam L2 is scanned by the vector scan in the peripheral portions of the irradiation region, specifically, the both ends in the division width direction. On the other hand, for the remaining irradiation region, as described above, the raster scan of the second laser beam L2 is repeated in a certain direction for each divided region divided by a predetermined division width to sinter the material powder layer 8 in a band shape. With such a configuration, since the overlapping of the spots of the laser beam L can be minimized and the sintered state can be stabilized, the molded object with higher quality can be obtained. Further, FIGS. 11D, 11E and 11F sequentially show a mode in which scan is performed in a direction different from those in FIGS. 11A, 11B and 11C. In this way, the molding direction i.e., scan direction, of the second laser beam L2 is arbitrarily determined according to the shape and the like of the irradiation region. Therefore, the direction of the spot shape is adjusted by the spot shape rotation mechanism 45c according to the molding direction so that the longitudinal direction of the spot shape of the second laser beam L2 is perpendicular to the molding direction.

Figure 11D:
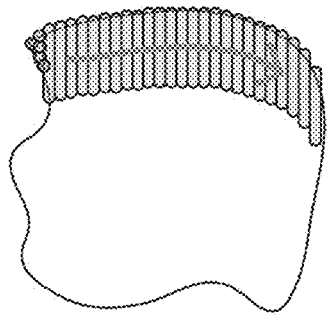
Figure 11E:
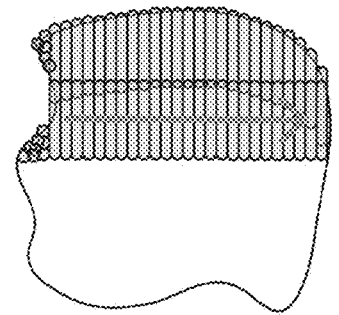
Figure 11F:
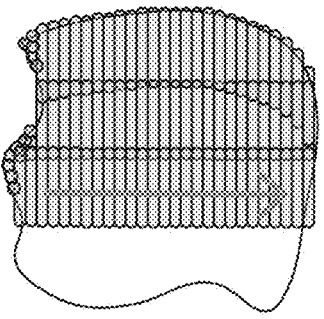

In addition, in FIGS. 11D, 11E and 11F show a mode in which for a narrow portion that is not suitable for molding using the second laser beam L2, i.e., a portion in which the shape to be sintered is small or fine as compared with the spot shape of the second laser beam L2, the second laser beam L2 is switched to a laser beam L having the other spot shape. In this case, the second laser beam L2 is switched to the first laser beam L1 having a substantially circular spot shape. Thus, by using the spot shape properly according to the shape of the irradiation position and the like, higher quality molding can be realized. Note that it is desirable to set the laser intensity suitable for molding by each laser beam L according to switching of the laser beam L.

Figure 12A:
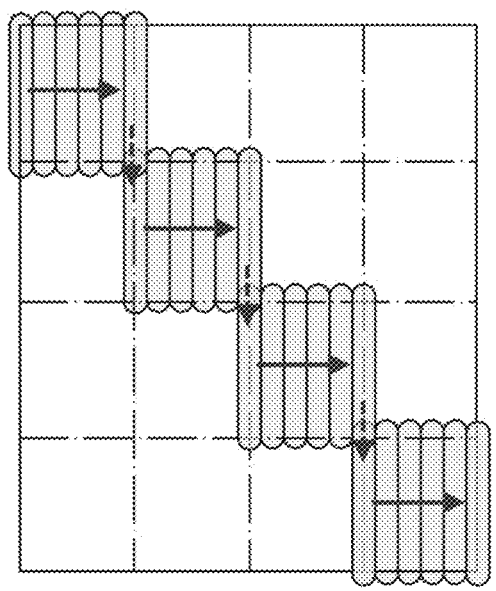
Figure 12B:
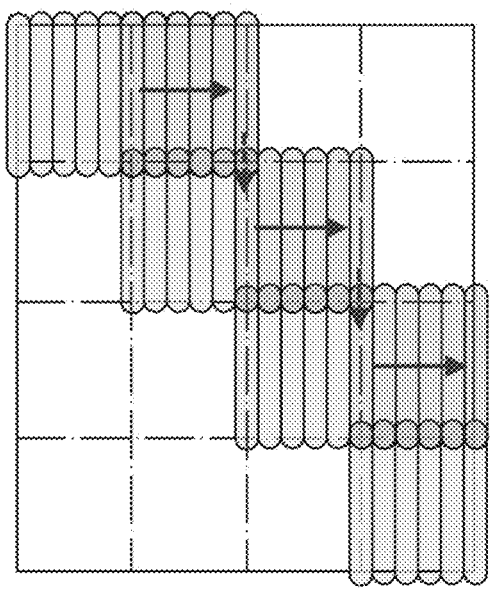

As another example of a scanning method of the laser beam L, the following scan is also adoptable. First, as described with reference to FIG. 6B, each divided region is further divided along the molding direction by a predetermined length, and divided regions like a grid pattern are set. Then, scan is performed so as not to continuously irradiate the divided regions vertically or horizontally adjacent to each other. For example, as shown in FIG. 12A, the divided regions adjacent diagonally with respect to the molding direction are sintered by the second laser beam L2 in order. Then, as shown in FIG. 12B, in order to sinter the continued portions of the previously sintered portions, the divided regions adjacent diagonally with respect to the molding direction are sequentially and repeatedly irradiated with the second laser beam L2. Scanning the laser beam L in this way reduces the stress generated in the sintered layer at the time of cooling after the sintering. Thus, warpage in the molded object can be suppressed. Further, when the heat generated during sintering propagates to the surroundings thereof and the material powder layer 8 is excessively heated during the sintering, various problems including sintering failure such as voids and abnormal sintered parts, deterioration of quality, and fume generation are likely to occur. In such scan of the laser beam L, since the irradiation is not performed continuously to the divided regions adjacent in the horizontal or vertical direction in which the heat generated by the sintering is likely to be transmitted, various problems due to the influence of heat are suppressed. Note that the molding direction for each divided region may not be consistent. For example, a molding direction in a certain divided region and another molding direction in other divided region vertically or horizontally adjacent may be set to intersect perpendicularly.

Note that FIGS. 11A to 11F and 12A and 12B schematically show the optical path of the laser beam L and the proper use of the laser beam L according to the irradiation position by sequentially arranging the spot shapes of the laser beam L. In fact, the laser beam L is irradiated incessantly while being scanned in the direction of the molding.

The scanning method of the laser beam L according to the present invention is not limited to the examples shown above. For example, the first laser beam L1 may be scanned by the vector scan at the periphery of the molding region, and the second laser beam L2 may be scanned by the raster scan for the remaining molding region. Further, a single sintered layer may be formed by combining scans in a plurality of molding directions. Alternatively, the molding direction may be changed for each sintered layer. In addition to the specific examples, various scanning methods can be adopted as long as the meaning of the present invention is not impaired, and the above examples can be combined with each other as a matter of course.

Furthermore, the laser beam L is preferably a pulsed laser. That is, in forming the sintered layer, the laser beam L is scanned while switching ON/OFF at a high speed with a predetermined pulse width. Preferably, the pulse width (ON time) is set to 1 to 10 ms, and the OFF time is set to 0.1 to 50 ms. This makes it possible to mold an object with thermal effects suppressed, and to stabilize the sintering state of the material powder layer 8. Of course, the present invention is not limited to this, and the laser beam L may be a continuous wave laser.

Next, referring to FIGS. 1 and 13-16, the lamination molding method using the afore-mentioned lamination molding apparatus will be explained. Note that in FIGS. 13-16, in consideration of visibility, some of elements shown in FIG. 1 are omitted.

Figure 13:
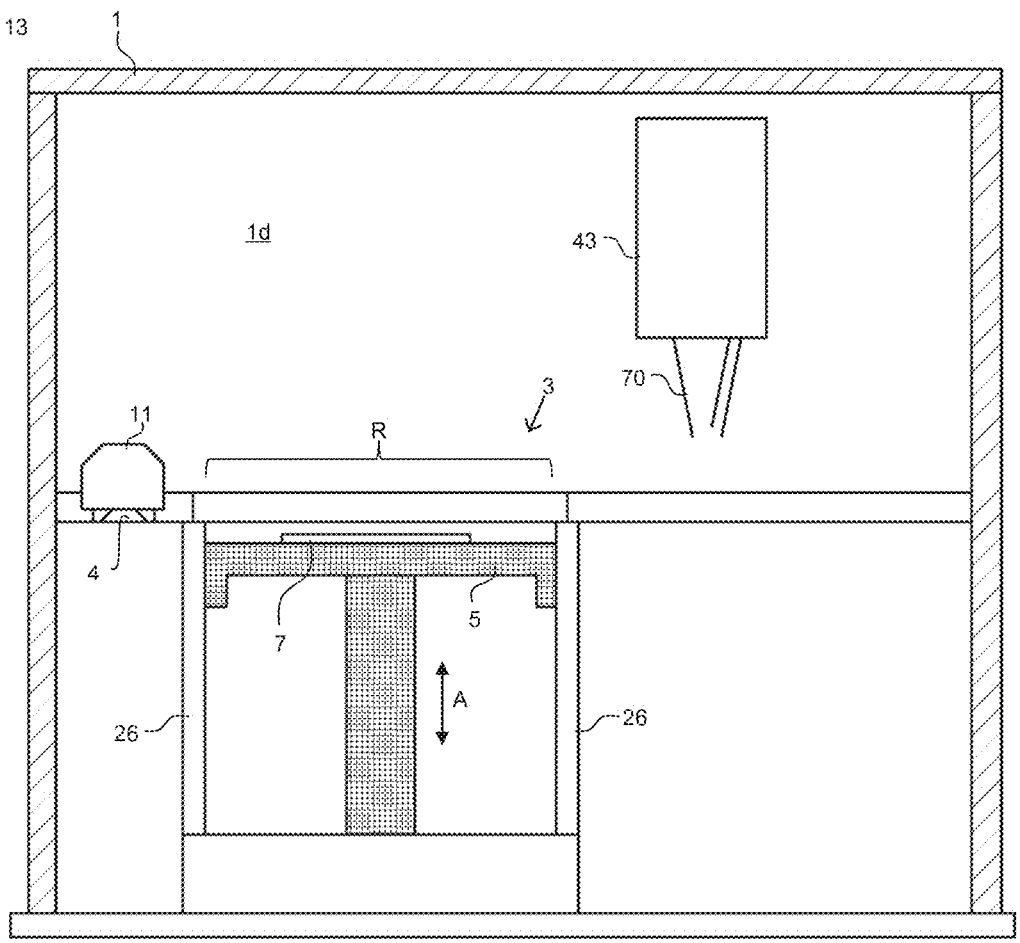

First, the molding plate 7 is placed on the molding table 5, and the height of the molding table 5 is adjusted to an appropriate position as shown in FIG. 13. In this state, the recoater head 11 with the material holding section 11a being filled with the material powder is moved from the left side to the right side of the molding region R, in the direction shown by arrow B in FIG. 1. Accordingly, a first layer of the material powder layer 8 is formed on the molding plate 7 as shown in FIG. 14. Note that as shown in FIGS. 13 and 14, when moving the recoater head 11, the holder 43 is retracted to a retracted position (upper right in the figures) so as to prevent physical interference between the recoater head 11 and holder 43.

Subsequently, as shown in FIG. 15, the holder 43 moves from the retracted position to an irradiation position and a predetermined portion of the material powder layer 8 is irradiated with the laser beam L, thereby sintering the portion of the material powder layer 8 being irradiated with the laser beam. Accordingly, a first layer of sintered layer 81*f* is obtained. The fumes generated during this sintering are mainly suctioned from the suction opening 72*b* of the fume suction cover 72 and discharged through the cover unit discharging opening 72*a*.

Then, the height of the molding table 5 is descended by the thickness corresponding to one layer of the material powder layer 8. Subsequently, the recoater head 11 is moved from the right side to the left side of the molding region R. Accordingly, a second layer of the material powder layer 8 is formed on the sintered layer 81*f*. During the movement of the recoater head 11, the fume is suctioned from the recoater head discharging opening 11*rs*. Such a fume suction is particularly effective since it is performed at a position extremely close to the fume generation place.

Next, predetermined portion of the material powder layer 8 is irradiated with the laser beam L, thereby sintering the portion of the material powder layer 8 being irradiated with the laser beam. Accordingly, the second layer of sintered layer 82*f* is obtained as shown in FIG. 16. The fumes generated during this sintering are mainly suctioned from the suction opening 72*b* of the fume suction cover 72 and discharged through the cover unit discharging opening 72*a*.

By repeating these procedures, the third and subsequent layers of sintered layers are formed. The adjacent sintered layers are firmly fixed with each other.

Non-sintered material powder is removed after forming a desired number of the sintered layers, thereby the molded sintered object can be obtained. The sintered object is applicable to a mold for the resin molding for example.

The present invention can be implemented in following manners.

First, a machining head having a spindle may be provided in the chamber 1. In such a case, the cutting can be performed on the molded object each time a predetermined number (e.g., ten layers) of sintered layers are formed. The drive shaft of the machining head may be partially or entirely common to the drive shaft of the drive device 65 of the holder 43 or may be provided separately.

Alternatively, the holder 43 may serve as the function of the machining head.

Secondly, instead of the recoater head 11, the holder 43 may comprise a material supplying apparatus and a blade planarizing the material powder. In such a case, there is no need to consider the physical interference between the recoater head 11 and holder 43.

Thirdly, instead of using the holder 43 and drive device 65, for example, a rotational single-axis mirror may be used as a scan unit. In the present invention, since high speed is not required for scanning the laser beam L, various scan devices can be adopted.

Fourthly, without using the spot shape conversion optical system 45*b*, the laser beam L having the elongated spot shape may be directly irradiated.

EXPLANATION OF SYMBOLS

1: chamber
1*b*: chamber supplying opening
1*c*: chamber discharging opening
1*d*: molding room
1*e*: sub supplying opening
3: powder layer forming apparatus
4: base
5: molding table
7: molding plate
8: material powder layer
8*f*: sintered layer
81*f*: sintered layer
11: recoater head
11*a*: material holding section
11*b*: material supplying section 11c: material discharging section
11fb: blades
11fs: recoater head supplying opening
11rs: recoater head discharging opening
15: inert gas supplying apparatus
19: fume collector
21: duct box
23: duct box
26: powder retaining wall
34a: first discharging opening supply
42: laser beam source
42a: optical cable
43: holder
43a: optical connector
43b: laser beam emit end
44: collimator
45: optical processing unit
45a: protective glass
45b: spot shape conversion optical system
45c: spot shape rotation mechanism
45d: irradiation head
65: drive device
70: cover unit
71: inert gas supplying cover
71a: cover unit supplying opening
71b: blowout opening
72: fume suction cover
72a: cover unit discharging opening
72b: suction opening
81f: sintered layer
82f: sintered layer
L: laser beam
L1: first laser beam
L2: second laser beam
R: molding region

What is claimed is:

1. A lamination molding apparatus, comprising:
a chamber covering a molding region;
a laser beam source to emit a laser beam for sintering a material powder layer supplied on the molding region to form a sintered layer;
an optical processing unit; and
a scan unit to scan the laser beam, wherein:
the optical processing unit comprises:
a plurality of spot shape conversion optical systems, wherein one of the plurality of spot shape conversion optical systems converts a shape of the laser beam emitted by the laser beam source to an elongated shape;
a spot shape rotation mechanism rotating the plurality of spot shape conversion optical systems; and
an irradiation head selecting one of the plurality of spot shape conversion optical systems; and
wherein the scan unit comprises a holder provided with an emit end of the laser beam source and a drive device moving the holder to an arbitrary position above the molding region in a lateral direction of the elongated shape.

2. The apparatus of claim 1, wherein:
the spot of the laser beam has a uniform intensity distribution over a longitudinal direction of the elongated shape.

3. The apparatus of claim 1, wherein:
the laser beam is a pulsed laser.

4. The apparatus of claim 1, wherein:
the elongated spot shape of the laser beam has a ratio of a length in the longitudinal direction and a width in the lateral direction,
wherein the ratio of the length to the width is 4 to 1000.

5. The apparatus of claim 1, wherein:
the plurality of spot shape conversion optical systems comprise micro-lens arrays.

6. The apparatus of claim 1, wherein:
the plurality of spot shape conversion optical systems comprise diffraction gratings.

7. The apparatus of claim 1, further comprising:
a recoater head movable in a horizontal direction; and
a blade provided on a side of the recoater head and planarizing a material powder to form the material powder layer on the molding region.

8. The apparatus of claim 1, wherein the scan unit further comprises:
a cover unit provided at a lower side of the holder and opening toward the molding region;
a protective glass allowing the laser beam to pass through and preventing an inert gas containing a fume from flowing into an inside of the holder; and
a cover unit supplying opening provided directly below the protective glass and supplying a clean inert gas into the cover unit.

* * * * *